United States Patent
Lee et al.

(10) Patent No.: US 10,467,410 B2
(45) Date of Patent: Nov. 5, 2019

(54) APPARATUS AND METHOD FOR MONITORING CONFIDENTIALITY AND INTEGRITY OF TARGET SYSTEM

(71) Applicant: ELECTRONICS AND TELECOMMUNICATIONS RESEARCH INSTITUTE, Daejeon (KR)

(72) Inventors: Sangrok Lee, Daejeon (KR); Junghee Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 263 days.

(21) Appl. No.: 15/404,579

(22) Filed: Jan. 12, 2017

(65) Prior Publication Data

US 2018/0046804 A1    Feb. 15, 2018

(30) Foreign Application Priority Data

Aug. 10, 2016    (KR) .......... 10-2016-0101904

(51) Int. Cl.
*G06F 21/00* (2013.01)
*G06F 21/56* (2013.01)
*G06F 21/57* (2013.01)

(52) U.S. Cl.
CPC .......... *G06F 21/566* (2013.01); *G06F 21/57* (2013.01)

(58) Field of Classification Search
CPC .................................. G06F 21/566
USPC .......................................... 726/23
See application file for complete search history.

(56) References Cited

U.S. PATENT DOCUMENTS

| 7,818,729 | B1* | 10/2010 | Plum | .......... | G06F 11/3624 |
|           |     |         |      |            | 717/140      |
| 8,370,687 | B2  | 2/2013  | Pedersen et al. | | |
| 9,542,557 | B2  | 1/2017  | Paek et al. | | |

(Continued)

FOREIGN PATENT DOCUMENTS

| KR | 10-2008-0022181 A | 3/2008 |
| KR | 10-1358815 B1 | 2/2014 |

OTHER PUBLICATIONS

Nick L. Petroni, Jr. et al., "Copilot—a Coprocessor-based Kernel Runtime Integrity Monitor," USENIX Security Symposium, 2004.

(Continued)

*Primary Examiner* — Longbit Chai
(74) *Attorney, Agent, or Firm* — LRK Patent Law Firm

(57) ABSTRACT

An apparatus and method for monitoring the confidentiality and integrity of a target system. The apparatus for monitoring the confidentiality and integrity of a target system includes a target area information reception unit for receiving target area information about a target area of the target system and storing the target area information, a monitoring unit for extracting attack information by monitoring at least one of confidentiality, corresponding to a data load instruction, and integrity, corresponding to a data store instruction, based on the target area information, and an attack-handling unit for determining whether an attack is occurring based on the extracted attack information and for handling the attack when it is determined that an attack is occurring.

20 Claims, 10 Drawing Sheets

(56) References Cited

U.S. PATENT DOCUMENTS

2014/0359183 A1   12/2014  Paek et al.
2016/0357958 A1*  12/2016  Guidry .................... G06F 21/53

OTHER PUBLICATIONS

Ziyi Liu et al., "CPU Transparent Protection of OS Kernel and Hypervisor Integrity with Programmable DRAM," ACM, 2013.
Hyungon Moon et al., "Vigilare: Toward Snoop-based Kernel Integrity Monitor," ACM, 2012.
Hojoon Lee et al., "Kl-Mon: A Hardware-assisted Event-triggered Monitoring Platform for Mutable Kernel Object," USENIX Security, 2013.

* cited by examiner

APPARATUS AND METHOD FOR MONITORING CONFIDENTIALITY AND INTEGRITY OF TARGET SYSTEM

CROSS REFERENCE TO RELATED APPLICATION

This application claims the benefit of Korean Patent Application No. 10-2016-0101904, filed Aug. 10, 2016, which is hereby incorporated by reference in its entirety into this application.

BACKGROUND OF THE INVENTION

1. Technical Field

The present invention relates generally to technology for monitoring the confidentiality and integrity of a target system and, more particularly, to technology for guaranteeing the confidentiality and integrity of an operating system, applications and library software in a target system in which on-chip debug logic is installed.

2. Description of Related Art

Techniques for monitoring the integrity of a code area and a data area are largely categorized into two approaches. The first one is a hardware-based approach, and the second one is a software-based approach.

A hardware-based approach is configured such that hardware, specially produced for monitoring, is installed in a system and is used to detect attempts to write to a code area, which is subject to monitoring. As examples of hardware-based kernel integrity monitors, there are Copilot, Vigilare, KI-Mon, and the like. However, conventional hardware-based techniques require special hardware, and it may be difficult to install such hardware in an embedded system.

A PCI card-based memory monitoring technique is a kind of snapshot method in which a memory state is periodically checked and a hash value calculated therefrom is compared with a hash value in a normal state, whereby tampering with memory can be detected. Also, a technique for monitoring memory input/output using a memory card inserted in a memory slot is configured such that the execution of rootkit at the time of tampering with an OS kernel is detected as a result of checking the memory of a target OS. Here, the PCI card-based memory monitoring technique and the memory card-based monitoring technique require a special hardware device.

Also, a technique through which an attempt to tamper with kernel memory is detected using a hardware device that is capable of snooping on a memory bus and a technique for monitoring dynamically changing kernel memory values have been developed. However, these techniques require special hardware from the aspect of the system. Further, when attackers modify data present in a cache, these techniques may not detect such an attack because data are not input or output via a system bus.

A software-based approach is a technique for monitoring and guaranteeing the integrity of code and data using page tables. However, if malware has the same level of privilege as monitoring software, the malware can modify data and software code, such as page tables and the like, thereby escaping detection.

Also, the software-based approach is disadvantageous in that a page fault caused by violation of access permissions may greatly slow down system responsiveness. Also, it is disadvantageous in that access control based only on three types, namely reading, writing, and execution, can be performed, and it is impossible to distinguish between instruction fetch, a data load instruction, and a data store instruction.

Therefore, the development of a technique in which the confidentiality and integrity of a system can be monitored using a monitoring apparatus installed in or outside the system is required. In connection with this, Korean Patent No. 10-1358815 discloses a technology related to "Snoop-based kernel integrity monitoring apparatus and method thereof."

SUMMARY OF THE INVENTION

An object of the present invention is to guarantee the confidentiality and integrity for an Operating System (OS), applications, and library software in a system in which on-chip debug logic is installed.

Another object of the present invention is to monitor and guarantee the confidentiality of code by detecting a data load instruction, executed in order for malware to read from a code area, and by preventing such a data load instruction from being executed.

A further object of the present invention is to monitor and guarantee the integrity of code by detecting a data store instruction, executed in order for malware to write to a code area, and by preventing data therein from being modified.

Yet another object of the present invention is to detect an attack on a cache, which is difficult to detect using a conventional bus-snooping method and a conventional snapshot method using a system bus.

Still another object of the present invention is to monitor and guarantee the integrity of unchangeable data by detecting a data store instruction, executed in order for malware to write to an unchangeable data area, and by preventing data therein from being modified.

Still another object of the present invention is to monitor and guarantee the integrity of variable data by detecting a data store instruction, executed in order for malware to write a data value that falls out of a normal range to a variable data area, and by preventing data therein from being modified to abnormal values.

Still another object of the present invention is to implement an apparatus for monitoring confidentiality and integrity so as to be installed inside a target system, whereby the monitoring apparatus may be installed without damage to the target system even if the target system is a system in which an external hardware device is difficult to install, such as a mobile device, an embedded device, and the like.

Still another object of the present invention is to implement a monitoring apparatus so as to be installed outside a target system and to operate independently from the target system, whereby the monitoring apparatus is not affected by the integrity of the target system.

In order to accomplish the above objects, an apparatus for monitoring confidentiality and integrity of a target system according to the present invention includes a target area information reception unit for receiving target area information about a target area of the target system and storing the target area information; a monitoring unit for extracting attack information by monitoring at least one of confidentiality, corresponding to a data load instruction, and integrity, corresponding to a data store instruction, based on the target area information; and an attack-handling unit for determining whether an attack is occurring based on the extracted attack information and for handling the attack when it is determined that an attack is occurring.

Here, the target area may include at least one of a code area and a data area for at least one of a kernel, an application, and a library.

Here, the target area information may include at least one of a code type, an absolute address, a relative address, a function type, an execution type, a data type and a data range corresponding to the target area.

Here, the monitoring unit may extract the absolute address based on at least one of the relative address and the function type when the target area information does not include the absolute address.

Here, the monitoring unit may include a debug logic control unit for controlling debug logic so that the debug logic generates a debug event when the data load instruction corresponding to the target area information is detected, and a debug event detection unit for detecting the generated debug event and extracting the attack information, which includes target area information and processor information corresponding to the debug event.

Here, the processor information may include at least one of a register value and a stack memory value of a processor that executes the instruction.

Here, the attack-handling unit may determine whether an attack is occurring by determining whether the attack information corresponds to the target area information.

Here, the attack-handling unit may interrupt execution of the data load instruction or return a value other than a memory value corresponding to the data load instruction when it is determined that an attack is occurring.

Here, the monitoring unit may include a debug logic control unit for controlling debug logic so that the debug logic generates a debug event when the data store instruction corresponding to the target area information is detected, and a debug event detection unit for detecting the generated debug event and extracting the attack information, which includes target area information and processor information corresponding to the debug event.

Here, the attack-handling unit may determine whether an attack is occurring by determining whether the attack information is a data store instruction for writing a value that falls out of a normal range, based on the attack information and the received target area information.

Here, when it is determined that an attack is occurring, the attack-handling unit may interrupt execution of the data store instruction or may not write a value corresponding to the data store instruction to memory.

The apparatus may further include a handling result output unit for outputting at least one of the attack information and a result of handling the attack.

Here, the apparatus may be installed inside the target system, and the monitoring unit may extract the attack information by directly controlling debug logic of the target system.

Here, the monitoring unit may control debug logic of the target system using a debug port of the target system from an outside of the target system, and may extract the attack information by controlling the debug logic.

Also, a method for monitoring confidentiality and integrity of a target system, performed by an apparatus for monitoring confidentiality and integrity of the target system according to an embodiment of the present invention, may include receiving target area information about a target area of the target system and storing the target area information; extracting attack information by monitoring at least one of confidentiality, corresponding to a data load instruction, and integrity, corresponding to a data store instruction, based on the target area information; determining whether an attack is occurring based on the extracted attack information; and handling the attack when it is determined that an attack is occurring.

Here, extracting the attack information may include controlling debug logic so that the debug logic generates a debug event when the data load instruction corresponding to the target area information is detected; detecting the generated debug event; and extracting the attack information, which includes target area information and processor information corresponding to the debug event.

Here, determining whether an attack is occurring may be configured to determine whether an attack is occurring by determining whether the attack information corresponds to the target area information, and handling the attack may be configured to interrupt execution of the data load instruction or to return a value other than a memory value corresponding to the data load instruction when it is determined that an attack is occurring.

Here, extracting the attack information may include controlling debug logic so that the debug logic generates a debug event when the data store instruction corresponding to the target area information is detected; detecting the generated debug event; and extracting the attack information, which includes target area information and processor information corresponding to the debug event.

Here, determining whether an attack is occurring may be configured to determine whether an attack is occurring by determining whether the attack information is a data store instruction for writing a value that falls out of a normal range, based on the attack information and the received target area information, and handling the attack may be configured to interrupt execution of the data store instruction or not to write a value corresponding to the data store instruction to memory when it is determined that an attack is occurring.

Here, the apparatus for monitoring confidentiality and integrity may directly control debug logic of the target system by being installed inside the target system, or may control the debug logic using a debug port from an outside of the target system.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
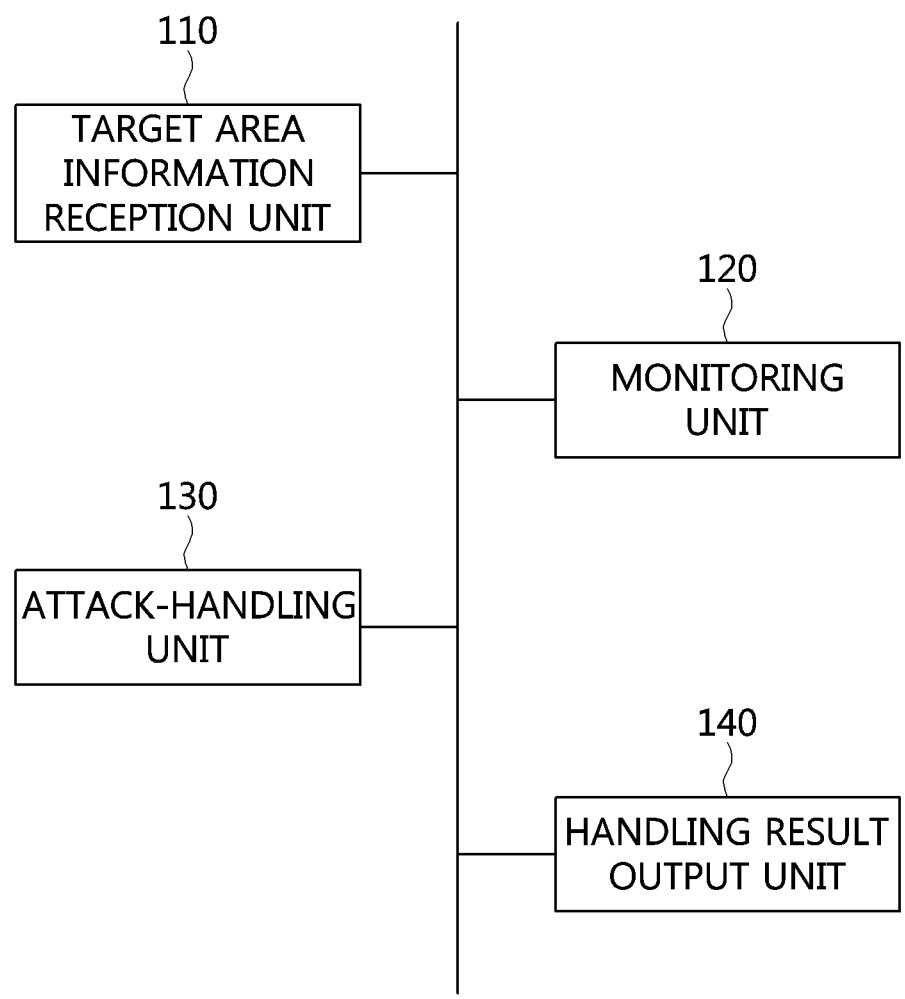
FIG. 1 is a block diagram that shows the configuration of an apparatus for monitoring the confidentiality and integrity of a target system according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment according to the present invention will be described in detail with reference to the accompanying drawings.

FIG. 1 is a block diagram that shows the configuration of an apparatus for monitoring the confidentiality and integrity of a target system according to an embodiment of the present invention.

As illustrated in FIG. 1, an apparatus 100 for monitoring the confidentiality and integrity of a target system includes a target area information reception unit 110, a monitoring unit 120, an attack-handling unit 130, and a processing result output unit 140.

First, the target area information reception unit 110 receives information about a target area in a target system, which is subject to monitoring.

Here, the target area may include at least one of a data area and a code area for at least one of a kernel, an application and a library. Also, the target area information may include at least one of a code type, an absolute address, a relative address, a function type, an execution type, a data type, and a data range, which correspond to the target area.

Next, the monitoring unit 120 extracts attack information by monitoring at least one of confidentiality and integrity based on the target area information. Here, the monitoring unit 120 may monitor confidentiality, corresponding to an instruction for reading data, or integrity, corresponding to an instruction for writing data.

Here, the instruction for reading data may be any one of a data load instruction and a data read instruction, and the instruction for writing data may be any one of a data store instruction and a data write instruction.

The apparatus 100 for monitoring confidentiality and integrity according to an embodiment of the present invention uses the fact that debug logic can distinguish between instruction fetch by a processor, an instruction for reading data, and an instruction for writing data.

Also, the monitoring unit 120 controls the debug logic so that the debug logic generates a debug event when at least one of an instruction for reading data from the target area and an instruction for writing data thereto is detected. Here, the debug logic may be on-chip debug logic.

The monitoring unit 120 may control the debug logic by setting the target area information on the debug logic. Here, the monitoring unit 120 may set the absolute address corresponding to the target area information and an instruction type on the debug logic.

If the target area information, received by the target area information reception unit 110, does not include an absolute address, the monitoring unit 120 may extract the absolute address based on at least one of a relative address and a function type. Then, the monitoring unit 120 may control the debug logic based on the extracted absolute address.

The debug logic, controlled by the monitoring unit 120, generates a debug event when the execution of an instruction is detected in the range of the absolute address corresponding to the target area. Also, the monitoring unit 120 extracts the generated debug event, and thereby checks the confidentiality of code for an OS, applications, and libraries and the integrity of code and data.

In other words, when at least one of an instruction for reading data and an instruction for writing data is detected in the address range corresponding to the target area information, the debug logic generates a debug event. Then, the monitoring unit 120 detects the generated debug event and extracts attack information, which includes target area information and processor information corresponding to the debug event. Here, the processor information may include at least one of a register value and a stack memory value of the process that executes the instruction.

The attack-handling unit 130 determines whether an attack is occurring based on the extracted attack information and handles the attack when it is determined that an attack is occurring.

Here, the attack-handling unit 130 determines whether the attack information corresponds to the target area information, thereby determining whether an attack is occurring. When it is determined that an attack is occurring, the attack-handling unit 130 may interrupt the execution of the instruction for reading data, or may return a value other than a memory value corresponding to the instruction for reading data.

Also, the attack-handling unit 130 may determine whether an attack is occurring by determining whether the attack information relates to an instruction for writing data, the value of which falls out of a normal range, based on the attack information and received target area information. Here, when it is determined that an attack is occurring, the attack-handling unit 130 may interrupt the execution of the instruction for writing data, or may not write the value corresponding to the instruction to the memory.

The handling result output unit 140 outputs at least one of the attack information and the result of handling the attack.

The apparatus 100 for monitoring the confidentiality and integrity of a target system according to an embodiment of the present invention may be installed inside the target system, or may be arranged outside the target system.

Particularly, when the apparatus 100 for monitoring confidentiality and integrity is installed inside the target system, the apparatus 100 for monitoring confidentiality and integrity may extract attack information by directly controlling the debug logic of the target system. Meanwhile, when the apparatus 100 for monitoring confidentiality and integrity is located outside the target system, the apparatus 100 for monitoring confidentiality and integrity may control the debug logic using a debug port of the target system.

Hereinafter, the configuration of the monitoring unit of an apparatus for monitoring the confidentiality and integrity of a target system according to an embodiment of the present invention will be described in detail with reference to FIG. 2.

Figure 2:
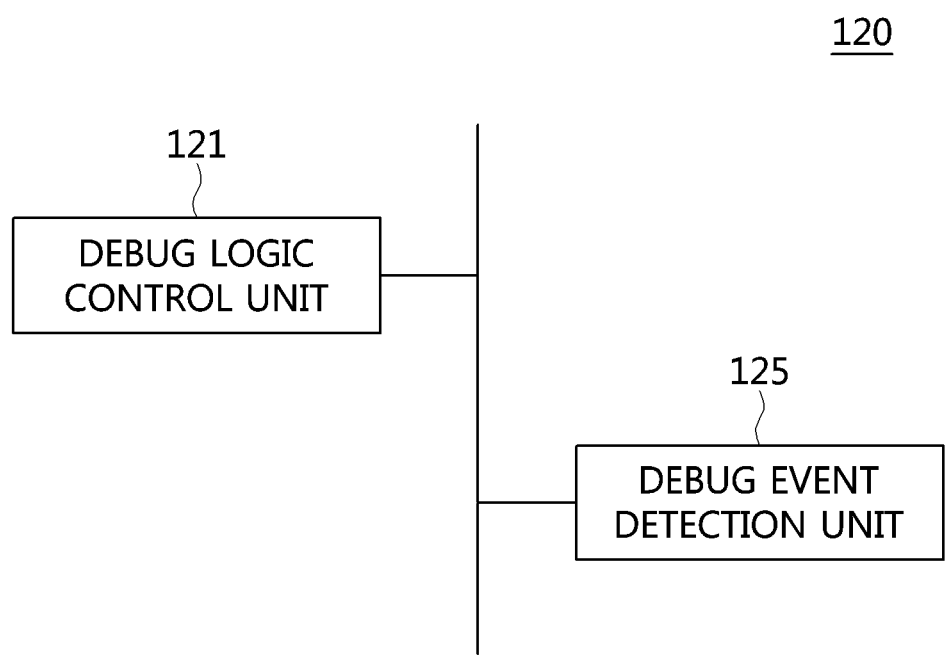
FIG. 2 is a block diagram that shows the configuration of a monitoring unit according to an embodiment of the present invention.

FIG. 2 is a block diagram that shows the configuration of a monitoring unit according to an embodiment of the present invention.

As illustrated in FIG. 2, the monitoring unit 120 of the apparatus 100 for monitoring the confidentiality and integrity of a target system includes a debug logic control unit 121 and a debug event detection unit 125.

First, the debug logic control unit 121 controls debug logic. Here, the debug logic control unit 121 controls the debug logic so that the debug logic generates a debug event when at least one of an instruction for reading data and an instruction for writing data corresponding to the target area information is detected.

The debug event detection unit 125 detects the debug event generated by the debug logic. Also, the debug event detection unit 125 extracts attack information, which includes target area information and processor information corresponding to the detected debug event.

Here, the processor information may include at least one of a register value and a stack memory value of the processor that executes at least one of an instruction for reading data and an instruction for writing data.

Hereinafter, a method for monitoring the confidentiality and integrity of a target system performed by an apparatus for monitoring the confidentiality and integrity of the target system according to an embodiment of the present invention will be described in detail with reference to FIGS. 3 to 6.

Figure 3:
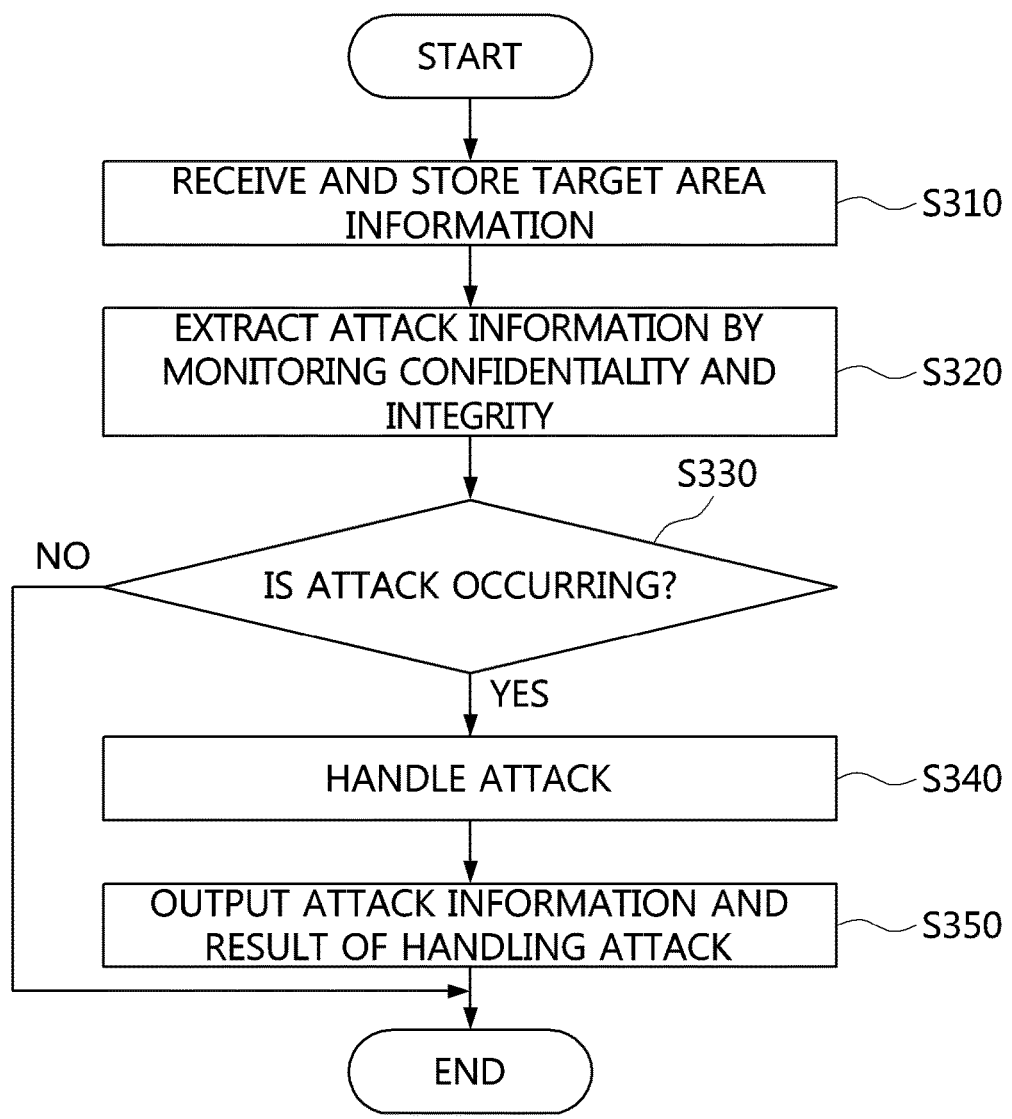
FIG. 3 is a flowchart for describing a method for monitoring the confidentiality and integrity of a target system according to an embodiment of the present invention.

FIG. 3 is a flowchart for describing a method for monitoring the confidentiality and integrity of a target system according to an embodiment of the present invention.

First, the apparatus 100 for monitoring confidentiality and integrity receives target area information and stores the received target area information at step S310.

The apparatus 100 for monitoring confidentiality and integrity receives information about a target area of a target system. Here the target system means a system, at least one of the confidentiality and integrity of which is subject to monitoring. The target system will be described later with reference to FIG. 4.

The target area may mean a data area and a code area for at least one of a kernel, an application, and a library of the target system. Also, the target area information may include at least one of a code type, an absolute address, a relative address, a function type, an execution type, a data type, and a data range, which correspond to the target area.

Also, the apparatus 100 for monitoring confidentiality and integrity extracts attack information at step S320 by monitoring confidentiality and integrity.

The apparatus 100 for monitoring confidentiality and integrity monitors the confidentiality and integrity of the target system based on the received target area information. Here, "confidentiality" may be confidentiality corresponding to an instruction for reading data, and "integrity" may be integrity corresponding to an instruction for writing data.

The apparatus 100 for monitoring confidentiality and integrity extracts attack information by monitoring the confidentiality and integrity of the target system. Here, the attack information may include target area information and processor information in a debug event corresponding to a detected instruction.

The apparatus 100 for monitoring confidentiality and integrity may extract attack information related to confidentiality if an instruction for reading data was extracted at step S320, and may extract attack information related to integrity if an instruction for writing data was extracted at step S320. The process in which the apparatus 100 for monitoring confidentiality and integrity monitors confidentiality and integrity and extracts attack information will be described later with reference to FIG. 5 and FIG. 6.

Subsequently, the apparatus 100 for monitoring confidentiality and integrity determines at step S330 whether an attack is occurring.

The apparatus 100 for monitoring confidentiality and integrity determines whether an attack is occurring, based on the extracted attack information and the target area information. Here, the apparatus 100 for monitoring confidentiality and integrity may determine whether an attack is occurring by determining whether the attack information corresponds to the target area information or by determining whether the attack information relates to an instruction for writing data, the value of which falls out of a normal range.

When it is determined that an attack is occurring, the apparatus 100 for monitoring confidentiality and integrity handles the attack at step S340.

When an attack is occurring, the apparatus 100 for monitoring confidentiality and integrity may interrupt the execution of at least one of an instruction for reading data and an instruction for writing data corresponding to the attack information. Also, the apparatus 100 for monitoring confidentiality and integrity may return a value other than a memory value corresponding to the instruction for reading data, or may not write a value corresponding to the instruction for writing data to the memory.

Conversely, when it is determined that an attack does not occur, the apparatus 100 for monitoring confidentiality and integrity may terminate the process of monitoring confidentiality and integrity, illustrated in FIG. 3.

Finally, the apparatus 100 for monitoring confidentiality and integrity outputs at least one of the attack information and the result of handling the attack at step S350.

The apparatus 100 for monitoring confidentiality and integrity may report at least one of the attack information and the result of handling the attack to a user, and may store it. Here, the method in which the apparatus 100 for monitoring confidentiality and integrity outputs the attack information and the result of handling the attack is not limited.

Figure 4:
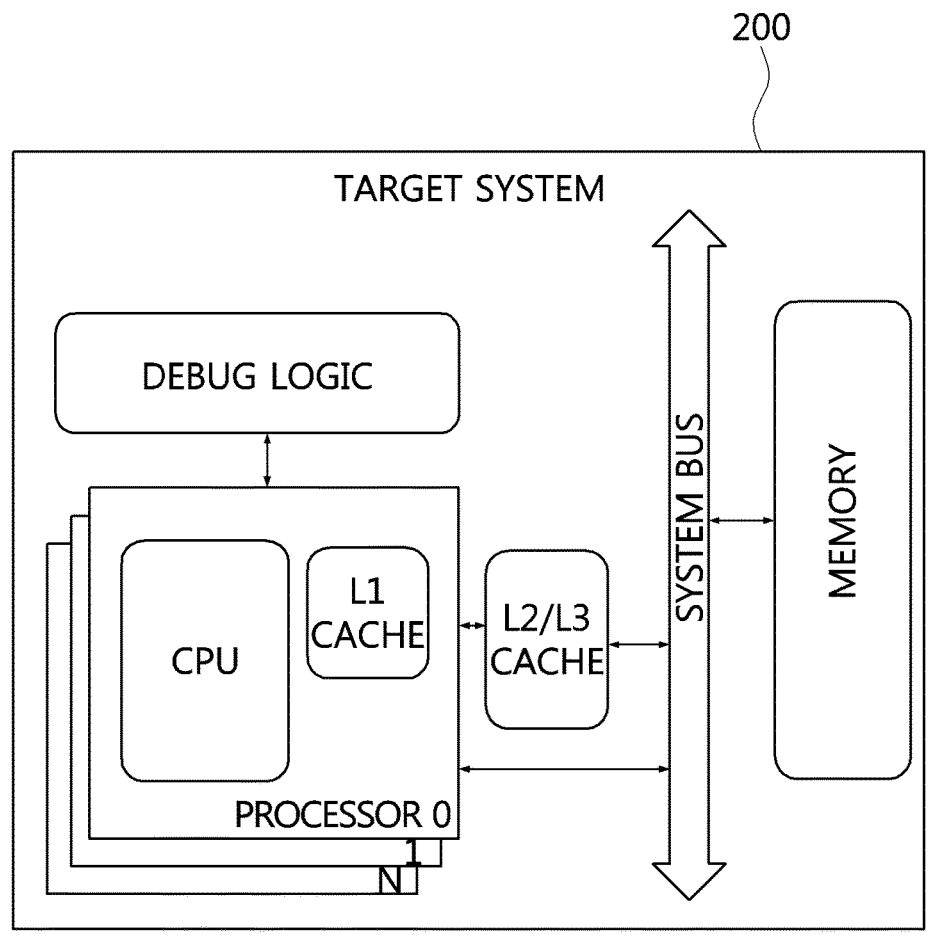
FIG. 4 is a view for describing a target system that is subject to monitoring according to an embodiment of the present invention.

FIG. 4 is a view for describing a target system according to an embodiment of the present invention.

As illustrated in FIG. 4, the processor of the target system 200 may include a Central Processing Unit (CPU) and an L1 cache. Generally, recently released processors include an L1 cache in order to improve performance. Also, an L2 cache and an L3 cache are arranged outside the processor, but an L2 cache and an L3 cache may not exist, depending on the system configuration, as in the case of the L1 cache.

The processor may be categorized into a single-core processor and a multi-core processor. The single-core processor includes one processor core, and the multi-core processor includes two or more processor cores. Each of the processor cores includes a CPU and an L1 cache. Particularly, the target system according to an embodiment of the present invention may mean a multi-core and multi-processor system.

Also, recently released processor chips are manufactured in the form of System-on-Chip (SoC), that is, a single chip may include a processor, on-chip debug logic, an L2 cache, an L3 cache, and peripherals therein.

These days, most PCs and mobile processor chips have on-chip debug logic embedded therein or enable the use of debug logic installed in a system. A Joint Test Action Group (JTAG) interface is representative on-chip debug logic, and on ARM architecture and Intel architecture, processor chips support the JTAG interface or dedicated debug logic.

In the debug logic, a data breakpoint (watchpoint) triggers a debug event when an instruction for reading data (data load and data read instructions) or an instruction for writing data (data store and data write instructions) at the data breakpoint location is executed. Here, the instruction for reading data differs from instruction fetch, through which a processor fetches code to be executed from memory. The instruction for reading data is an instruction for accessing a code area or a data area in order to read values from memory as data.

There are two types of debug events, which are a software debug event and a hardware debug event. The software debug event is handled by system software, such as an OS or the like. In the case of the hardware debug event, because the processor that generated the event is switched to a debugging state, the corresponding processor cannot handle the debug event.

Accordingly, the hardware debug event must be handled by an external hardware device connected to a debug port. Alternatively, in the case of a multi-processor or a multi-core system, another processor or another core may handle the event. Also, the data breakpoint may be set in order to trigger a debug event when a data value, related to an instruction for reading data or an instruction for writing data, falls within a certain range or when such a data value falls out of a certain range.

Hereinafter, a method in which an apparatus for monitoring confidentiality and integrity respectively monitors confidentiality and integrity will be described in detail with reference to FIG. 5 and FIG. 6.

Figure 5:
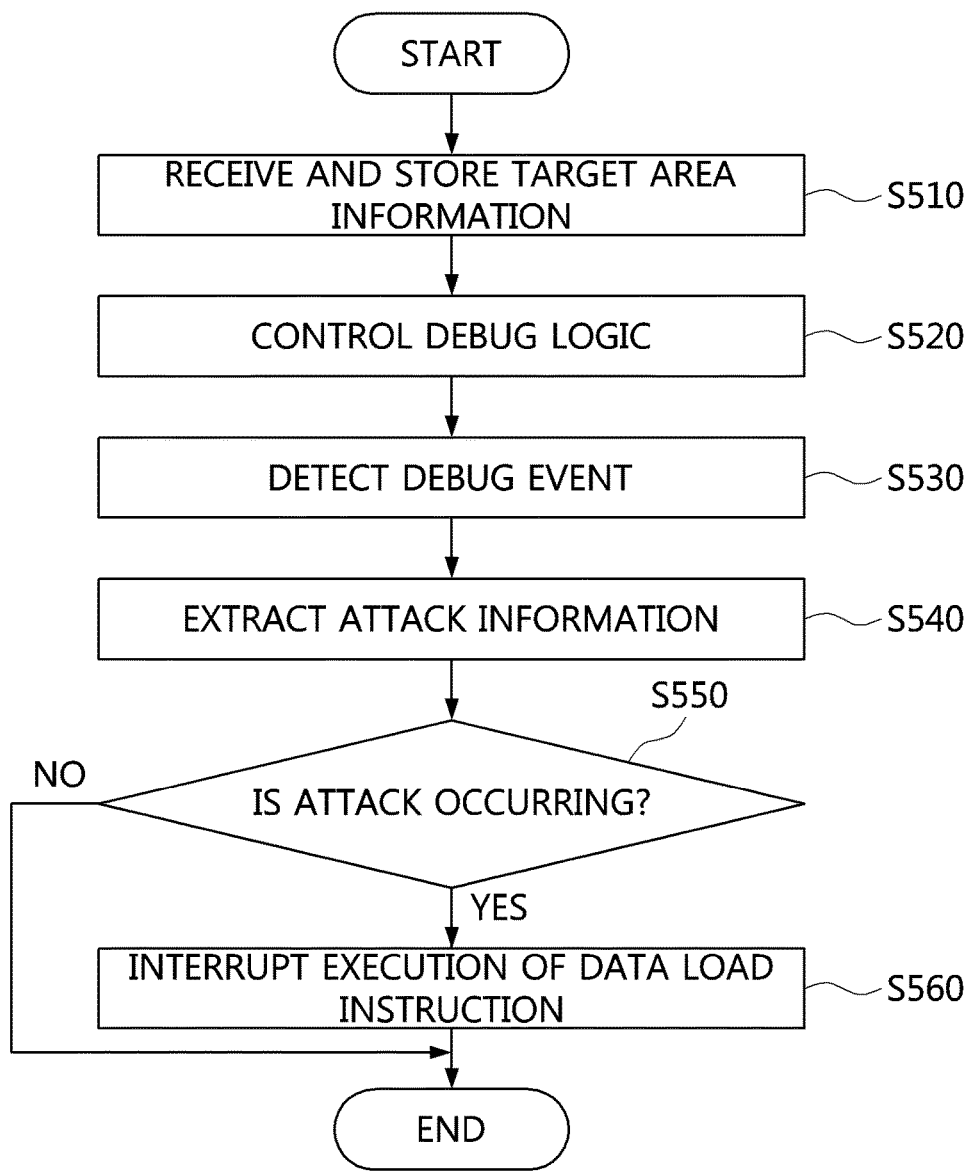
FIG. 5 is a flowchart for describing a method for monitoring confidentiality according to an embodiment of the present invention.

FIG. 5 is a flowchart for describing a method for monitoring confidentiality according to an embodiment of the present invention.

First, the apparatus 100 for monitoring confidentiality and integrity receives and stores target area information at step S510.

The apparatus 100 for monitoring confidentiality and integrity may receive information about a target area from a user. Here, the target area may mean a code area for at least one of a kernel, an application, and a library. Also, the apparatus 100 for monitoring confidentiality and integrity may dynamically set one or more code areas, and may monitor them.

The target area information may include a code type, an absolute address, a relative address, and a function type corresponding to the target area. Here the code type is information for determining whether the corresponding target area is a kernel, an application, or a library. The absolute address is an address range of a code area in the running target system. The absolute address may include information about whether the address is a virtual address or a physical address, along with the address range.

Also, the relative address may be an offset, the amount of which indicates the distance between the location of the target area and a base address, but the relative address may be omitted when the target area information includes an absolute address.

Also, the function type is abstract information representing the functionality of the target area, and may mean information provided by a user in order to extract the memory location of the target area in the running target system when there is no address information, such as the absolute address or relative address of the target area. If a specific processor instruction pattern is detected in memory based on the function type, the apparatus 100 for monitoring confidentiality and integrity may determine that the memory area, in which the specific processor instruction pattern has been detected, is the code area corresponding to the function type.

Subsequently, the apparatus 100 for monitoring confidentiality and integrity controls debug logic at step S520 by setting the target area information on the debug logic.

The apparatus 100 for monitoring confidentiality and integrity controls the debug logic so that the debug logic generates a debug event when it detects that a processor is about to execute a data load instruction for the code area. The apparatus 100 for monitoring confidentiality and integrity sets the target area information on the debug logic, whereby, when the processor executes a data load instruction at the address corresponding to the target area information, the debug logic may interrupt the execution of the instruction and generate a debug event corresponding to the data load instruction.

Also, the apparatus 100 for monitoring confidentiality and integrity detects a debug event at step S530.

The debug logic generates a debug event when a data load instruction corresponding to the target area information is detected. Then, the apparatus 100 for monitoring confidentiality and integrity detects the debug event generated by the debug logic.

Subsequently, the apparatus 100 for monitoring confidentiality and integrity extracts attack information at step S540.

The apparatus 100 for monitoring confidentiality and integrity extracts attack information, which includes event information, target area information, and processor information, from the generated debug event. Here, the event information may include the address of the processor instruction that triggered the debug event, the address of the data to which access is attempted, and the type of the instruction. Also, the processor information may include a register value and a stack memory value. The target area information may include the address corresponding to the target area.

Subsequently, the apparatus 100 for monitoring confidentiality and integrity determines at step S550 whether an attack is occurring, and interrupts the execution of the data load instruction at step S560 when it is determined that an attack is occurring.

The apparatus 100 for monitoring confidentiality and integrity may determine whether an attack is occurring by comparing the attack information extracted at step S540 with the target area information, which was received from a user and has been stored.

The apparatus 100 for monitoring confidentiality and integrity determines whether the debug event corresponding to the attack information is included in the address range of the target area by comparing the data address corresponding to the attack information with the previously stored target area information. Then, the apparatus 100 for monitoring confidentiality and integrity determines whether an instruction that is subject to monitoring is executed in the corresponding target area by comparing the type of the instruction corresponding to the address range of the target area with the attack information.

For example, if the debug event is generated in the address range corresponding to the target area information, if the type of the instruction corresponding to the address range of the target area is a data load instruction, and if the instruction type corresponding to the extracted attack information is a data load instruction, the apparatus 100 for monitoring confidentiality and integrity determines that an attack is occurring.

Then, when it is determined that an attack is occurring, the apparatus 100 for monitoring confidentiality and integrity may interrupt the execution of the data load instruction, or may return a value other than the data value corresponding to the data load instruction.

Also, the apparatus 100 for monitoring confidentiality and integrity may store the attack information and the result of handling the attack, and may deliver them to a user. Here, the method for delivering the attack information and the result of handling the attack may be implemented using various methods, such as printing, transmission, and the like, and the methods are not limited to these examples.

Conversely, when it is determined that an attack does not occur, the apparatus 100 for monitoring confidentiality and integrity may terminate the process of monitoring confidentiality, illustrated in FIG. 5.

When malware attacks a kernel or applications, overflow attacks are commonly used. In order to protect against overflow attacks, Data Execution Prevention (DEP), in which code is prevented from being executed in a data area, is applied. Accordingly, the code inserted by an attacker cannot be executed in memory areas protected by DEP.

In order to circumvent DEP, attackers have exploited Return Oriented Programming (ROP). ROP collects code segments that are already loaded and executable in the memory area, and induces behavior desired by an attacker. In order to protect against ROP, Address Space Layout Randomization (ASLR) has been introduced, but recent malware does not search for desired code segments in advance but dynamically searches for such code segments while malware is being executed.

In order for malware to dynamically search for the desired code segments at run time, the code for the kernel, library, and application, which is already loaded into the memory, is used. To this end, the malware necessarily reads the code as data.

Therefore, the apparatus 100 for monitoring confidentiality and integrity according to an embodiment of the present invention monitors instructions for reading data from the code area of the kernel, library, and application using on-chip debug logic, and prevents such instructions from being executed, thereby guaranteeing the confidentiality of the code area. The confidentiality of the code area may be used to protect against ROP attacks.

Conventional access control using page tables supports control of three types of behavior, namely reading, writing, and execution, but cannot determine whether reading from the code area is instruction fetch, through which a processor reads an instruction to be executed, or a data load instruction for reading data from the memory. Accordingly, reading from the code area is unconditionally permitted in order to enable a processor to execute instructions, and thus the confidentiality of the code area may not be guaranteed.

However, the apparatus 100 for monitoring confidentiality and integrity according to an embodiment of the present invention uses the fact that debug logic may determine whether the instruction to be executed by a processor is a data load instruction, a data write instruction, or instruction fetch. In other words, using the debug logic, the apparatus 100 for monitoring confidentiality and integrity permits instruction fetch for the code area but defines behavior for reading data from the code area as the target to be monitored, whereby the confidentiality of the code area may be monitored and guaranteed.

Figure 6:
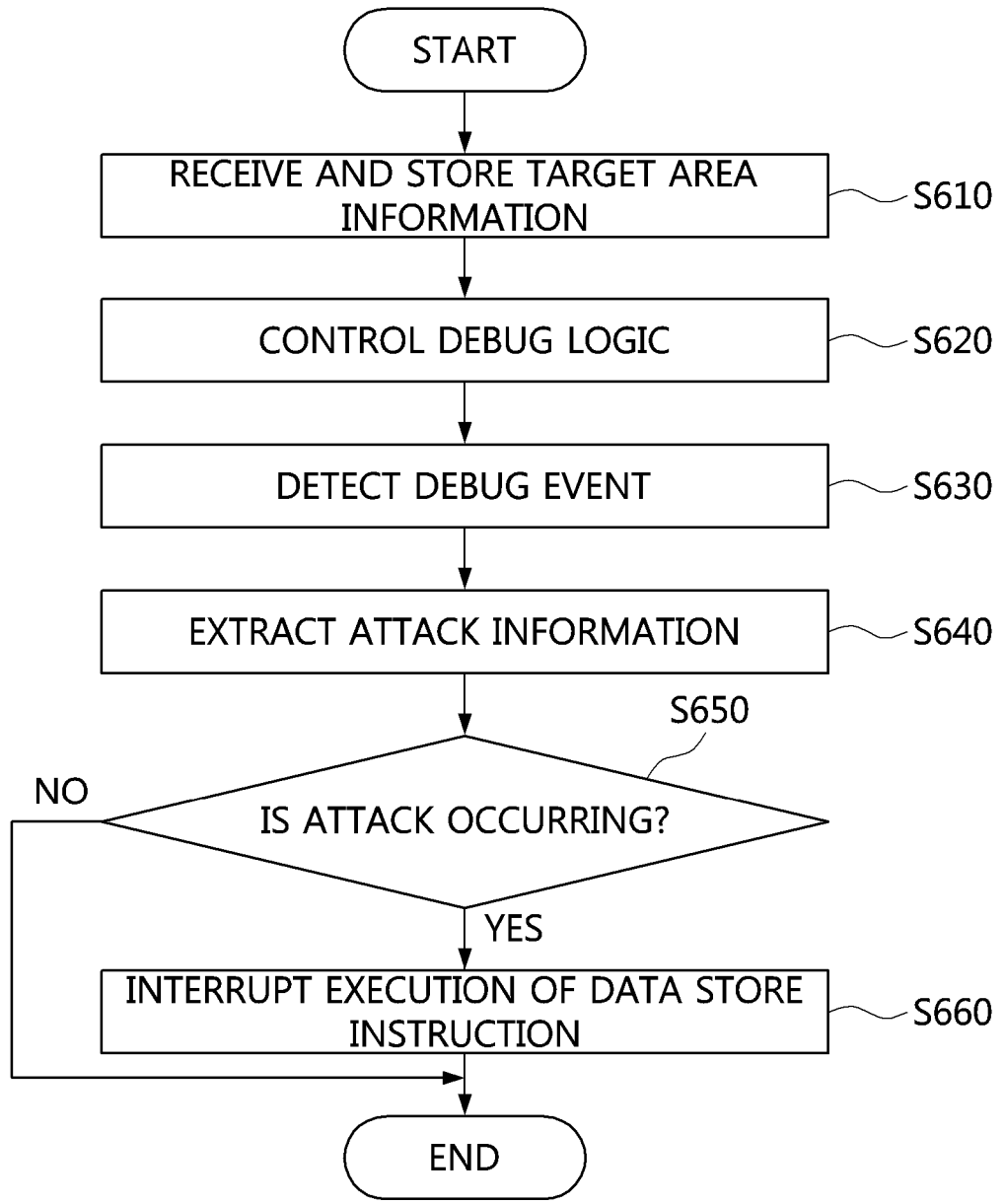
FIG. 6 is a flowchart for describing a method for monitoring integrity according to an embodiment of the present invention.

FIG. 6 is a flowchart for describing a method for monitoring integrity according to an embodiment of the present invention.

First, the apparatus 100 for monitoring confidentiality and integrity receives and stores information about a target area at step S610.

Here, the target area may include a code area and a data area for at least one of a kernel, an application, and a library. Also, the apparatus 100 for monitoring confidentiality and integrity may dynamically set and monitor one or more code areas and data areas.

Also, the apparatus 100 for monitoring confidentiality and integrity may receive target area information from a user, and the target area information may include at least one of an execution type, a data type, an absolute address, a relative address, a function type, and a data range, which correspond to the target area.

Here, the execution type is information for determining whether the corresponding target area is a kernel, an application, or a library, and the data type is information for determining whether the target area is a code area, an unchangeable data area, or a variable data area. Also, the term "absolute address" means an addresses range of the target area in the running target system. The absolute address may include information about whether the address is a virtual address or a physical address, along with the address range.

Also, the relative address may be an offset, the amount of which indicates the distance between the location of the target area and a base address, but the relative address may be omitted when the target area information includes an absolute address.

Also, the function type is abstract information representing the functionality of the target area, and may mean information provided by a user in order to extract the memory location of the target area in the running target system when there is no address information, such as the absolute address or relative address of the target area.

If the target area is a code area and if a specific processor instruction pattern is detected in memory, the apparatus 100 for monitoring confidentiality and integrity may determine that the memory area, in which the specific processor instruction pattern has been detected, is the target area corresponding to the function type. Also, if the target area is a data area and if a specific data pattern is detected in memory, the apparatus 100 for monitoring confidentiality and integrity may determine that the memory area, in which the specific data pattern has been detected, is the target area corresponding to the function type.

Also, the data range may indicate a normal range within which data values in the corresponding area are required to fall. Here, a data store instruction that intends to write data, the values of which fall out of the normal range, may be regarded as an abnormal attempt.

Subsequently, the apparatus 100 for monitoring confidentiality and integrity controls debug logic at step S620 by setting the target area information on the debug logic.

The apparatus 100 for monitoring confidentiality and integrity sets the target area information on the debug logic and thereby makes the debug logic generate a debug event when an instruction for writing data to the target area is detected. The debug logic, on which the target area information is set by the apparatus 100 for monitoring confidentiality and integrity, interrupts the execution of an instruction for writing data and generates a debug event when a processor executes the instruction for writing data to the target area.

The apparatus 100 for monitoring confidentiality and integrity may control the debug logic so that the debug logic generates a debug event for an instruction for writing data at the memory address of the target area.

Also, the apparatus 100 for monitoring confidentiality and integrity detects a debug event at step S630, and extracts attack information from the debug event at step S640.

When a debug event occurs, the apparatus 100 for monitoring confidentiality and integrity extracts attack information, which includes target area information and processor information, from the debug event. Here, the target area information may include at least one of the absolute address and the relative address of the target area, and the processor information may include at least one of a register value and a stack memory value.

The apparatus 100 for monitoring confidentiality and integrity determines at step S650 whether an attack is occurring based on the attack information. When it is determined that an attack is occurring, the apparatus 100 for monitoring confidentiality and integrity interrupts the execution of an instruction for writing data at step S660.

The apparatus 100 for monitoring confidentiality and integrity compares the attack information extracted from the debug event with the target area information received at step S610 and determines that an attack is occurring when the instruction for writing data attempts to write a data value that falls out of a normal range.

When the attack information matches the address range corresponding to the previously stored target area information and when the instruction type corresponding to the attack information matches the instruction type corresponding to the previously stored target area information, the apparatus 100 for monitoring confidentiality and integrity may determine that an attack is occurring.

When it is determined that an attack is occurring, the apparatus 100 for monitoring confidentiality and integrity interrupts the execution of the instruction for writing data or does not write a data value corresponding to the instruction at the memory address designated by the instruction.

Also, the apparatus 100 for monitoring confidentiality and integrity may store the attack information and the result of handling the attack, and may deliver them to a user. Here, methods for delivering the attack information and the result of handling the attack may be implemented using various methods, such as printing, transmission, and the like, and the methods are not limited to these examples.

Meanwhile, when it is determined that there is no attack, the instruction for writing data may be executed, or the process of monitoring the integrity, illustrated in FIG. 6, may be terminated.

In order to perform an attack on a Windows, Linux, or Android system, malware modifies code by overwriting the code area of an OS, a library, or an application with desired execution code through a shared library injection technique, a DLL injection technique, or a code injection technique.

Therefore, it is necessary to monitor for and prevent attempts to write to a code area when a system is booted or while the system is running. The apparatus 100 for monitoring confidentiality and integrity according to an embodiment of the present invention controls debug logic for a code area and detects a debug event, thereby detecting an instruction for writing data. Also, the apparatus 100 for monitoring confidentiality and integrity prevents values in the target memory area from being modified to abnormal values.

Not only attacks on a code area but also attacks for modifying values in a data area occur repeatedly. A representative example of such an attack is one in which the address of an instruction to be executed by a processor is changed to the address of a code area generated by an attacker by modifying an interrupt vector table or a system call table.

The apparatus 100 for monitoring confidentiality and integrity according to an embodiment of the present invention detects an instruction for writing to the main data area, including an interrupt vector table and a system call table, and prevents a value in the main data area from being modified to a value that falls out of a normal range. The apparatus 100 for monitoring confidentiality and integrity controls the debug logic, detects a debug event, and monitors and prevents an instruction for writing data, whereby the integrity of a code area, an unchangeable data area, and a variable data area may be monitored and guaranteed.

For the convenience of description, the method for monitoring confidentiality and the method for monitoring integrity, performed by the apparatus 100 for monitoring confidentiality and integrity, are described respectively with reference to FIG. 5 and FIG. 6. However, without limitation thereto, the apparatus 100 for monitoring confidentiality and integrity may monitor confidentiality and integrity at the same time.

In this case, the apparatus 100 for monitoring confidentiality and integrity extracts attack information including an instruction type at steps S540 and S640, compares the extracted instruction type with the instruction type corresponding to the previously stored target area information, and thereby determines whether a corresponding debug event relates to an attack.

Hereinafter, the form in which an apparatus for monitoring confidentiality and integrity is installed inside a target system or is arranged outside the target system will be described in detail with reference to FIG. 7 and FIG. 8.

The apparatus 100 for monitoring confidentiality and integrity may be implemented in the form of software that is installed and executed in the target system, or may be implemented in the form of hardware that is arranged outside the target system and executed independently from the target system.

Figure 7:
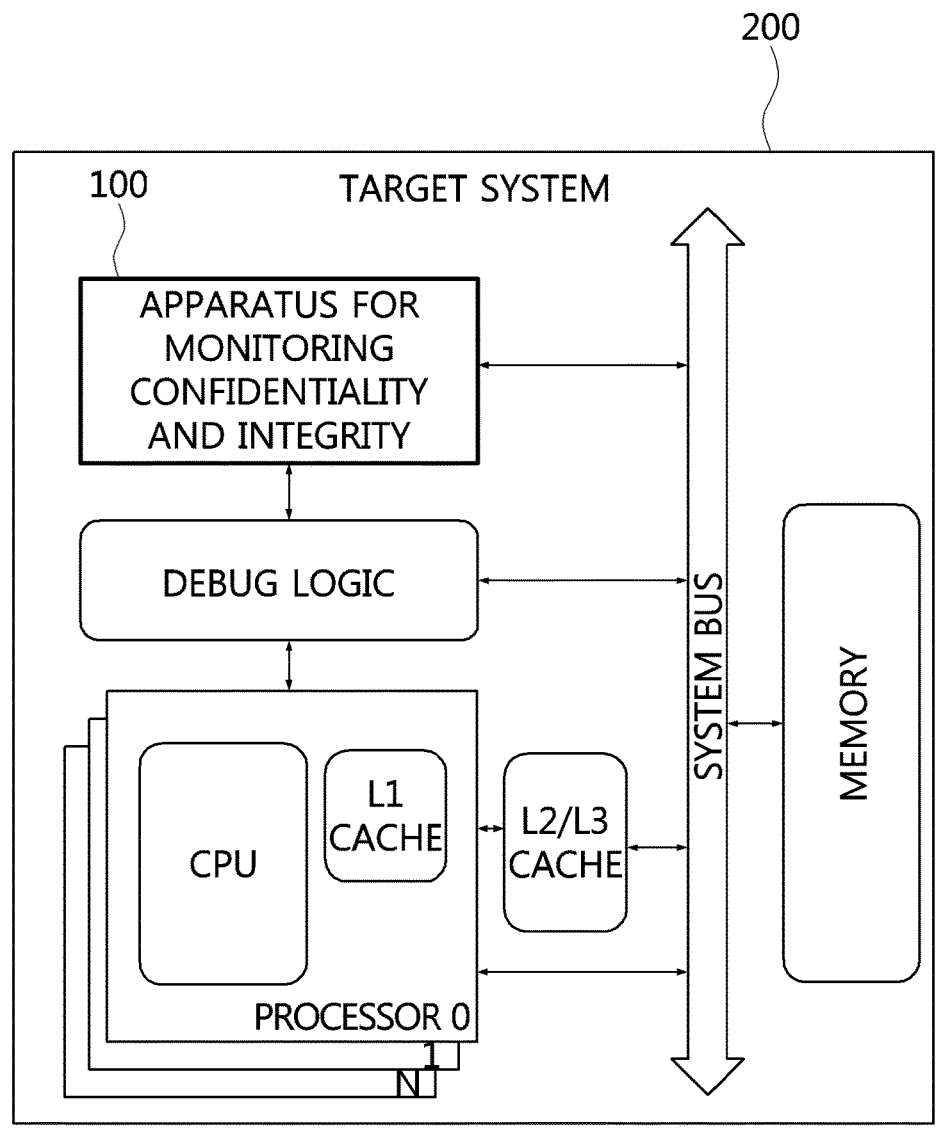
FIG. 7 is a view for describing the form in which an apparatus for monitoring confidentiality and integrity according to an embodiment of the present invention is installed inside a target system.

FIG. 7 is a view for describing the form in which the apparatus for monitoring confidentiality and integrity according to an embodiment of the present invention is installed inside a target system.

As illustrated in FIG. 7, the apparatus 100 for monitoring confidentiality and integrity may be implemented in the form of software, and may be installed in the target system.

Also, the apparatus 100 for monitoring confidentiality and integrity may control the debug logic of a target system by being directly connected thereto, and may detect and analyze a debug event. Also, the apparatus 100 for monitoring confidentiality and integrity may access memory using a system bus, and may control the debug logic through the system bus.

Particularly, when the apparatus 100 for monitoring confidentiality and integrity is installed inside the target system, the apparatus 100 may detect, in advance, access by an attacker to debugging logic or behavior executed by a processor in order to infect a memory area that is being used by the apparatus 100, and may prevent malicious instructions from being executed.

Here, the apparatus 100 for monitoring confidentiality and integrity may use a privileged processor mode in order to prevent an attacker having the privilege of a kernel level or user level from accessing a code area and a data area used by the apparatus for monitoring confidentiality and integrity.

Also, the apparatus 100 for monitoring confidentiality and integrity may use the privileged processor mode in order to prevent an attacker from accessing debug logic. Here, the privileged processor mode may include privileged modes provided by commercial processors, such as a hypervisor for virtualization, TrustZone of ARM, and the like.

As described above, when an apparatus 100 for monitoring confidentiality and integrity is implemented in the form of software, there is no need to install a separate hardware device in a target system.

Figure 8:
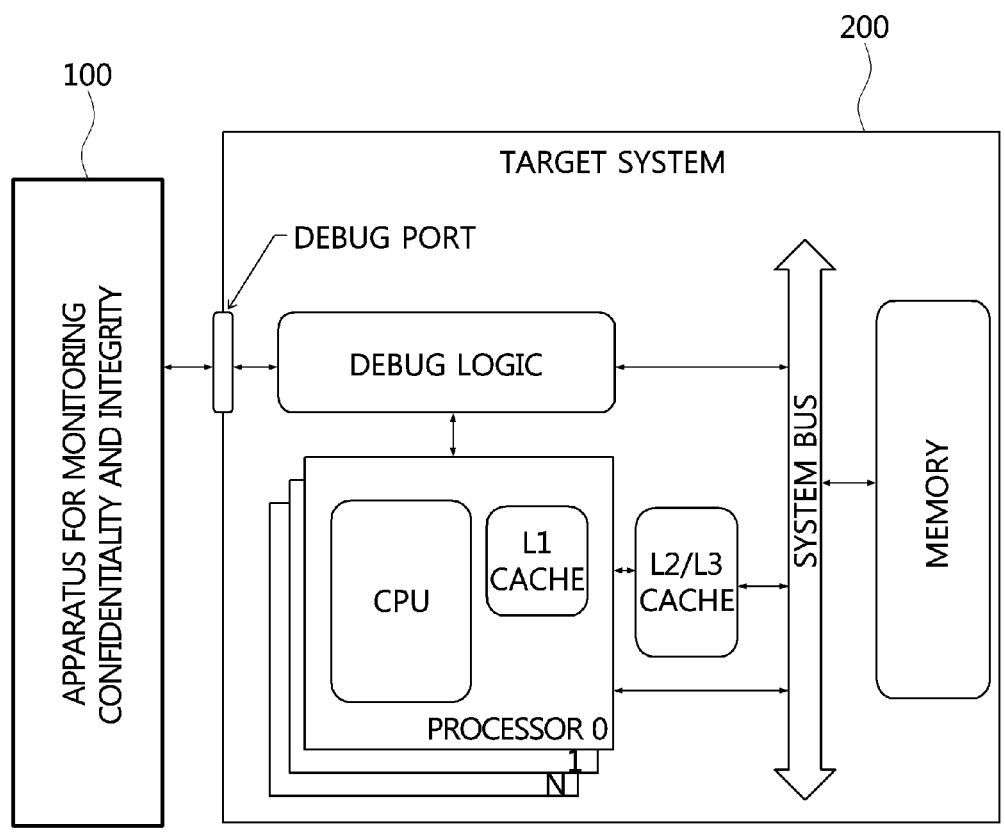
FIG. 8 is a view for describing the form in which an apparatus for monitoring confidentiality and integrity according to an embodiment of the present invention is arranged outside a target system.

FIG. 8 is a view for describing the form in which an apparatus for monitoring confidentiality and integrity according to an embodiment of the present invention is arranged outside a target system.

As shown in FIG. 8, the apparatus 100 for monitoring confidentiality and integrity may be implemented as an independent hardware device, and may be installed outside the target system. When the apparatus 100 for monitoring confidentiality and integrity is configured as independent hardware, as shown in FIG. 8, the apparatus is not affected by the integrity of the target system.

Also, the apparatus 100 for monitoring confidentiality and integrity may be connected with the target system via a debug port. The software embedded in the apparatus 100 for monitoring confidentiality and integrity may control the debug logic through the debug port, and may detect a debug event. Also, the apparatus 100 for monitoring confidentiality and integrity may access the memory of the target system through the debug logic.

Excluding peripheral components, the apparatus 100 for monitoring confidentiality and integrity, illustrated in FIG. 8, may have the same purpose, functions, and components as the apparatus 100 for monitoring confidentiality and integrity illustrated in FIG. 7, which is implemented in the form of software.

Hereinafter, the limitations of monitoring apparatuses according to the conventional art and the effects of the present invention will be described in detail with reference to FIG. 9.

Figure 9:
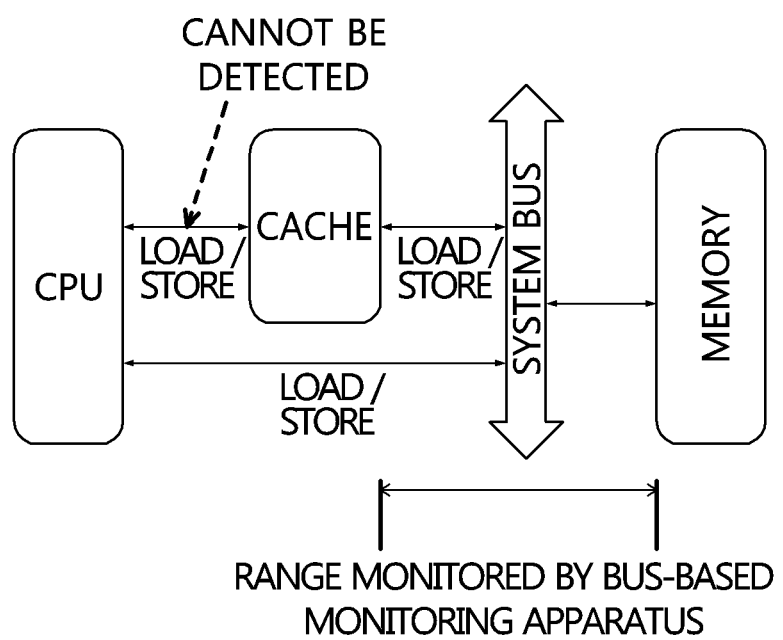
FIG. 9 is a view for describing limitations of system bus-based monitoring apparatuses according to a conventional art.

FIG. 9 is a view for describing the limitations of a system bus-based monitoring apparatus according to a conventional art.

Snapshot monitors, such as Copilot and the like, and system bus snooping-based monitors, such as Vigilare, KI-Mon, and the like, are monitors based on a system bus, which detect an attempt to write data shown on the system bus.

As illustrated in FIG. 9, the system bus-based monitoring apparatuses according to the conventional art cannot detect an attack when the attack attempts to read and write data between a CPU and a cache.

A processor may access code and data in the memory via a system bus. However, when the data in the memory also exist in the cache, because a data load instruction and a data store instruction may be executed by accessing only the cache, the processor does not need to access the system bus. The cached data may finally be deleted or written to the memory. When the cached data are written back to the memory or when data present only in the memory are accessed, a data load instruction or a data store instruction is executed via the system bus.

However, the time at which the system bus is accessed may be the time after the malware has already finished the attack and disappeared from the system. Also, even if a cache has been accessed multiple times, when the data in the cache are written to the memory, only the last change to the data appears in the system bus. Therefore, even if bus traffic is detected through the system bus, the behavior executed by malware in the interval between bus traffic detection events may not be caught. Due to this problem, known techniques for detecting system bus traffic, including Vigilare and KI-Mon, may not detect a cache-based attack.

These days, processors and OSs are developing and introducing a method for making the best use of cache space, and the proportion of use of cache space is increasing. However, the system bus-based monitoring apparatuses according to the conventional art may not detect an attack on data between a CPU and a cache because they use a system bus.

On the other hand, the apparatus 100 for monitoring confidentiality and integrity according to an embodiment of the present invention controls on-chip debug logic installed in a target system and detects an instruction for reading data from a target area and an instruction for writing data to the target area by analyzing a debug event. Particularly, the apparatus 100 for monitoring confidentiality and integrity monitors the confidentiality of code by detecting an instruction for reading data from a code area, and may detect an attack on a cache, which is difficult to analyze using a conventional system bus-based method, by detecting an instruction for writing data to the code area and the data area.

The on-chip debug logic installed in the target system is designed to enable each instruction executed by a processor to be monitored. Also, the apparatus 100 for monitoring confidentiality and integrity according to an embodiment of the present invention performs a debug logic-based monitoring method in which, when a processor executes an instruction, instruction fetch, a data load instruction, and a data store instruction are detected by analyzing a debug event generated by the debug logic. Accordingly, it has better performance in monitoring confidentiality and integrity, compared to conventional system bus-based monitoring techniques, in which monitoring is possible only when read or write data traffic appears in a system bus.

Figure 10:
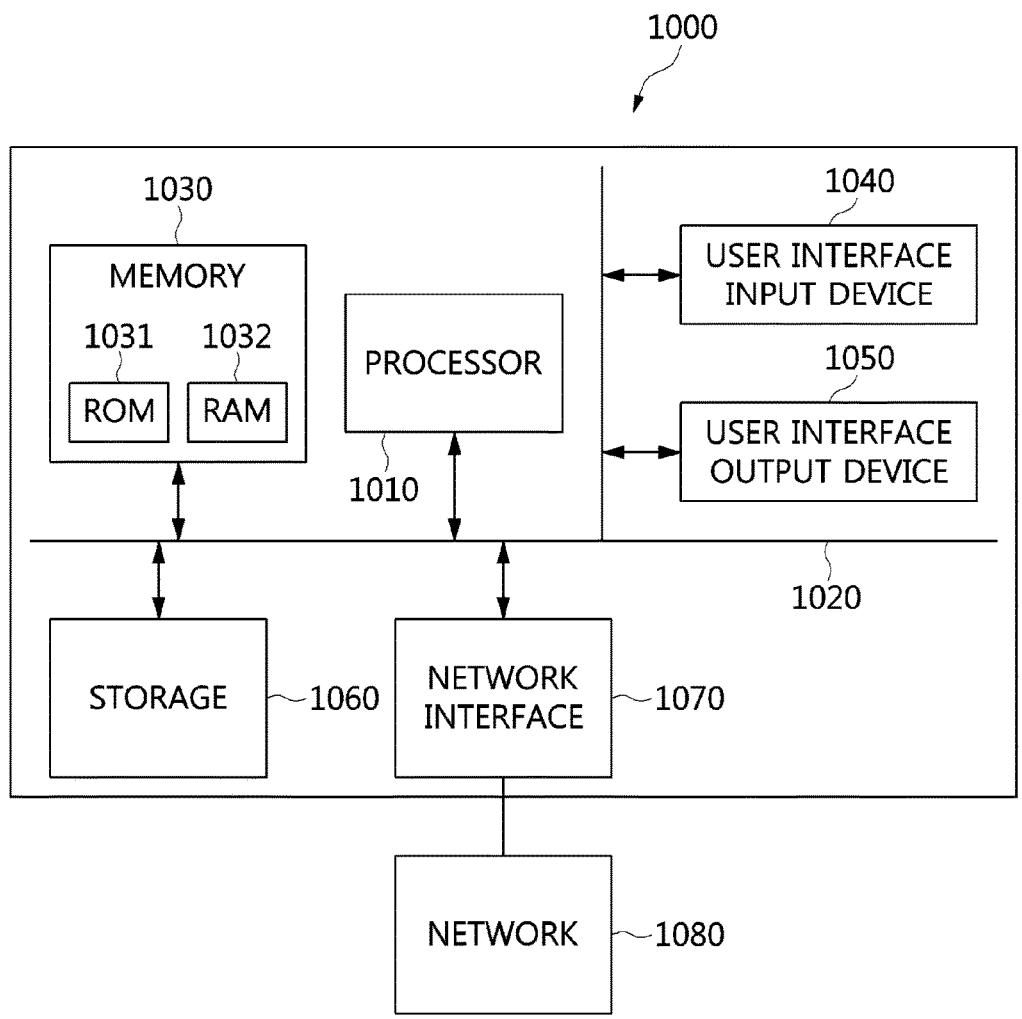
FIG. 10 is a block diagram that shows a computer system according to an embodiment of the present invention.

FIG. 10 is a block diagram that shows a computer system according to an embodiment of the present invention.

Referring to FIG. 10, an embodiment of the present invention may be implemented in a computer system 1000, such as a computer-readable storage medium. As illustrated in FIG. 10, the computer system 1000 may include at least one processor 1010, memory 1030, a user interface input device 1040, a user interface output device 1050, and storage 1600, which communicate with each other via a bus 1020. Also, the computer system 1000 may further include a network interface 1070 connected to a network 1080. The processor 1010 may be a central processing unit (CPU) or a semiconductor device for executing processing instructions stored in the memory 1030 or the storage 1060. The memory 1030 and the storage 1060 may include various kinds of volatile or nonvolatile storage media. For example, the memory may include ROM 1031 or RAM 1032.

Accordingly, an embodiment of the present invention may be implemented as a non-temporary computer-readable storage medium in which methods implemented using a computer or instructions executable in a computer are recorded. When the computer-readable instructions are executed by a processor, the computer-readable instructions may perform a method according to at least one aspect of the present invention.

According to the present invention, the confidentiality and integrity of an OS, applications, and library software may be guaranteed in a system in which on-chip debug logic is installed.

Also, according to the present invention, a data load instruction, executed in order for malware to read from a code area, is detected and is prevented from being executed, whereby the confidentiality of code may be monitored and guaranteed.

Also, according to the present invention, a data store instruction, executed in order for malware to write to a code area, is detected, and data therein are prevented from being modified, whereby the integrity of code may be monitored and guaranteed.

Also, according to the present invention, it is possible to detect an attack on a cache, which is difficult to detect through a conventional bus-snooping method and a conventional snapshot method using a system bus.

Also, according to the present invention, a data store instruction, executed in order for malware to write to an unchangeable data area, is detected, and data therein are prevented from being modified, whereby the integrity of unchangeable data may be monitored and guaranteed.

Also, according to the present invention, a data store instruction, executed in order for malware to write a data value that falls out of a normal range to a variable data area, is detected, and data therein are prevented from being modified to abnormal values, whereby the integrity of variable data may be monitored and guaranteed.

Also, according to the present invention, because an apparatus for monitoring confidentiality and integrity is implemented so as to be installed inside a target system, the monitoring apparatus may be installed without damage to the target system even if the target system is a system in which an external hardware device is difficult to install, such as a mobile device, an embedded device, and the like.

Also, according to the present invention, a monitoring apparatus is implemented so as to be installed outside a target system and to operate independently from the target system, whereby the monitoring apparatus may not be affected by the integrity of the target system.

As described above, an apparatus and method for monitoring the confidentiality and integrity of a target system according to the present invention are not limitedly applied to the configurations and operations of the above-described embodiments, but all or some of the embodiments may be selectively combined and configured, so that the embodiments may be modified in various ways.

What is claimed is:

1. An apparatus for monitoring both confidentiality and integrity, comprising:
    a target area information reception unit receiving target area information, from a user entry, about a target area of a target system and storing the target area information;
    a monitoring unit extracting attack information by monitoring both (i) confidentiality, corresponding to a data load instruction such that the data load instruction, executed by a hardware processor, for reading data from a code area can be detected and generated as a debug event and (ii) integrity, corresponding to a data store instruction, executed by the hardware processor, for writing data to the code area can be detected, based on the target area information; and
    an attack-handling unit determining whether an attack is occurring based on the extracted attack information and for handling the attack when it is determined that an attack is occurring to prevent the detected data load instruction and data store instruction from being executed.

2. The apparatus of claim 1, wherein the target area includes at least one of a code area and a data area for at least one of a kernel, an application, and a library.

3. The apparatus of claim 2, wherein the target area information includes at least one of a code type, an absolute address, a relative address, a function type, an execution type, a data type and a data range corresponding to the target area.

4. The apparatus of claim 3, wherein the monitoring unit extracts the absolute address based on at least one of the relative address and the function type when the target area information does not include the absolute address.

5. The apparatus of claim 3, wherein the monitoring unit comprises:
    a debug logic control unit for controlling debug logic so that the debug logic generates a debug event when the data load instruction corresponding to the target area information is detected; and
    a debug event detection unit for detecting the generated debug event and extracting the attack information, which includes target area information and processor information corresponding to the debug event.

6. The apparatus of claim 5, wherein the processor information includes at least one of a register value and a stack memory value of a processor that executes the instruction.

7. The apparatus of claim 5, wherein the attack-handling unit determines whether an attack is occurring by determining whether the attack information corresponds to the target area information.

8. The apparatus of claim 7, wherein the attack-handling unit interrupts execution of the data load instruction or returns a value other than a memory value corresponding to the data load instruction when it is determined that an attack is occurring.

9. The apparatus of claim 3, wherein the monitoring unit comprises:
    a debug logic control unit for controlling debug logic so that the debug logic generates a debug event when the data store instruction corresponding to the target area information is detected; and
    a debug event detection unit for detecting the generated debug event and extracting the attack information, which includes target area information and processor information corresponding to the debug event.

10. The apparatus of claim 9, wherein the attack-handling unit determines whether an attack is occurring by determining whether the attack information is a data store instruction for writing a value that falls out of a normal range, based on the attack information and the received target area information.

11. The apparatus of claim 10, wherein the attack-handling unit interrupts execution of the data store instruction or does not write a value corresponding to the data store instruction to memory when it is determined that an attack is occurring.

12. The apparatus of claim 1, further comprising: a handling result output unit for outputting at least one of the attack information and a result of handling the attack.

13. The apparatus of claim 1, wherein:
    the apparatus is installed inside the target system; and
    the monitoring unit extracts the attack information by directly controlling debug logic of the target system.

14. The apparatus of claim 1, wherein the monitoring unit controls debug logic of the target system using a debug port of the target system from an outside of the target system and extracts the attack information by controlling the debug logic.

15. A method of monitoring both confidentiality and integrity of a target system, performed by an apparatus for monitoring confidentiality and integrity, the method comprising:

receiving target area information from a user entry associated with a target area of the target system and storing the target area information;

extracting attack information by monitoring both (i) confidentiality, corresponding to a data load instruction such that the data load instruction executed for reading data from a code area can be detected and generated as a debug event and (ii) integrity, corresponding to a data store instruction executed for writing data to the code area can be detected, based on the target area information;

determining whether an attack is occurring based on the extracted attack information; and handling the attack when it is determined that an attack is occurring to prevent the detected data load instruction and data store instruction from being executed.

16. The method of claim 15, wherein extracting the attack information comprises:

controlling debug logic so that the debug logic generates a debug event when the data load instruction corresponding to the target area information is detected;

detecting the generated debug event; and extracting the attack information, which includes target area information and processor information corresponding to the debug event.

17. The method of claim 16, wherein:

determining whether an attack is occurring is configured to determine whether an attack is occurring by determining whether the attack information corresponds to the target area information; and handling the attack is configured to interrupt execution of the data load instruction or to return a value other than a memory value corresponding to the data load instruction when it is determined that an attack is occurring.

18. The method of claim 15, wherein extracting the attack information comprises:

controlling debug logic so that the debug logic generates a debug event when the data store instruction corresponding to the target area information is detected;

detecting the generated debug event; and extracting the attack information, which includes target area information and processor information corresponding to the debug event.

19. The method of claim 18, wherein:

determining whether an attack is occurring is configured to determine whether an attack is occurring by determining whether the attack information is a data store instruction for writing a value that falls out of a normal range, based on the attack information and the received target area information; and handling the attack is configured to interrupt execution of the data store instruction or not to write a value corresponding to the data store instruction to memory when it is determined that an attack is occurring.

20. The method of claim 15, wherein the apparatus for monitoring confidentiality and integrity directly controls debug logic of the target system by being installed inside the target system or controls the debug logic using a debug port from an outside of the target system.

* * * * *